(12) United States Patent
Kang et al.

(10) Patent No.: US 7,783,409 B2
(45) Date of Patent: Aug. 24, 2010

(54) AIRFLOW ESTIMATION METHOD AND APPARATUS FOR INTERNAL COMBUSTION ENGINE

(75) Inventors: Jun-Mo Kang, Ann Arbor, MI (US); Chen-Fang Chang, Troy, MI (US); Jyh-Shin Chen, Troy, MI (US); Tang-Wei Kuo, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 364 days.

(21) Appl. No.: 11/739,137

(22) Filed: Apr. 24, 2007

(65) Prior Publication Data

US 2008/0167787 A1    Jul. 10, 2008

Related U.S. Application Data

(60) Provisional application No. 60/794,580, filed on Apr. 24, 2006.

(51) Int. Cl.
*B60T 7/12* (2006.01)
(52) U.S. Cl. .................. 701/103; 701/104; 701/105; 123/674; 123/675; 123/457
(58) Field of Classification Search .......... 701/101–106, 701/115; 123/674, 675, 457, 336, 447, 456, 123/435, 436, 400, 518, 468, 647, 198 DB; 73/114.38, 114.72, 118.02, 114.43, 114.39; 74/482; *B60T 7/12*
See application file for complete search history.

(56) References Cited

U.S. PATENT DOCUMENTS

| | | | |
|---|---|---|---|
| 6,216,083 B1 * | 4/2001 | Ulyanov et al. ............. 701/106 |
| 6,907,339 B2 | 6/2005 | Henn | |
| 6,990,936 B2 | 1/2006 | Arai | |
| 7,467,614 B2 * | 12/2008 | Stewart et al. ........... 123/198 F |
| 2001/0008990 A1 | 7/2001 | Ishii | |
| 2003/0088356 A1 | 5/2003 | Kabat | |
| 2004/0030484 A1 | 2/2004 | Yasui | |

OTHER PUBLICATIONS

Jankovic, Mrdjan, Constructive Lyapunov Control Design for Turbocharged Diesel Engines, Mar. 2000, IEEE Transactions on Control Systems Technology, vol. 8. No. 2, pp. 4-6.*

Sun, Jing, Modeling and Control of Automotive Powertrain Systems: A Tutorial, Jun. 8-10, 2005, 2005 American Control Conferences, pp. 2-4.*

K. Astrom, B. Wittenmark, Apative Control, Addison Wesley, 1995, pp. 206-215.

* cited by examiner

*Primary Examiner*—Stephen K Cronin
*Assistant Examiner*—Keith Coleman

(57) ABSTRACT

A model-based estimation of mass airflow is provided which provides an accurate estimation of mass airflow without introducing undesirable time delays characteristic of filtered mass airflow signals.

21 Claims, 3 Drawing Sheets

US 7,783,409 B2

AIRFLOW ESTIMATION METHOD AND APPARATUS FOR INTERNAL COMBUSTION ENGINE

CROSS REFERENCE TO RELATED APPLICATIONS

This application claims the benefit of U.S. Provisional Application No. 60/794,580 filed on Apr. 24, 2006 which is hereby incorporated herein by reference.

TECHNICAL FIELD

This invention relates to internal combustion engines. More particularly, the invention is concerned with accurately estimating mass airflow to the engine.

BACKGROUND OF THE INVENTION

The combustion process of homogeneous charge compression ignition (HCCI) engines depends strongly on factors such as cylinder charge composition, temperature, and pressure at the intake valve closing. Hence, the control inputs to the engine, for example, fuel injection mass and timing and intake/exhaust valve profile, must be carefully coordinated to ensure robust auto-ignition combustion. Generally, for best fuel economy, an HCCI engine operates un-throttled and with a lean air-fuel mixture. Further, in an HCCI engine using an exhaust recompression valve strategy, the cylinder charge temperature is controlled by trapping different amount of the hot residual gas from the previous cycle by advancing the exhaust valve close timing from nominal. The opening timing of the intake valve is retarded from nominal to a later time preferably symmetrical to the exhaust valve closing timing about top-dead-center (TDC) intake. Both the cylinder charge composition and temperature are strongly affected by the exhaust valve closing timing. In particular, more hot residual gas from the previous cycle can be retained with earlier closing of the exhaust valve which leaves less room for the incoming fresh air mass. The net effects are higher cylinder charge temperature and lower cylinder oxygen concentration. The negative valve overlap (NVO), defined as the crank-angle period where both intake and exhaust valves are simultaneously closed around TDC intake, is indicative of the trapped amount of hot residuals.

Robust HCCI combustion has been demonstrated using a variable valve actuation system such as a fully flexible valve actuation (FFVA) system (e.g. electrically variable, hydraulically variable or electro-hydraulically variable valves) or a simplified mechanical two-step valve lift system with a dual cam phasing system. In particular, optimal combustion phasing can be maintained by adjusting both intake and exhaust valve profiles in conjunction with engine control inputs such as injection mass and timing, spark timing, throttle and EGR valve positions. Furthermore, air-fuel ratio control is critical for maintaining robust HCCI combustion especially during transients.

In conventional gasoline spark-ignition engines, airflow is controlled by the throttle, and the fuel is metered proportional to the measured mass airflow at the throttle body using a MAF sensor. The noise level (i.e. high frequency components) of the MAF signal is low as long as the intake manifold absolute pressure (MAP) is far below the ambient pressure (i.e. throttled engine operation). However, during minimally throttled operation, noise levels can be substantial due to significant coupling of intake dynamics of the cylinders with the intake manifold and MAF sensor. During HCCI engine operations, the throttle is usually kept wide-open to minimize pumping losses, and the airflow is controlled by the exhaust and intake valve profiles (i.e. combinations of lift, duration and phase). Therefore, engines operating in an HCCI mode are also affected by MAF signals which can be substantially noisy. Similarly, in diesel engines, which operate without air throttling, MAF signals can similarly be substantially noisy. Although the high-frequency components in the MAF measurement can be reduced using a low pass filter, a filtered signal produces an undesirable time delay in the MAF measurement. Adapting fuel injection command using a filtered, and hence time delayed, MAF measurement can cause significant air-fuel ratio deviations during engine transient operations resulting in undesirable combustion results including, for example, partial burn, misfires, excessive emissions, combustion phase shifts, etc.

SUMMARY OF THE INVENTION

In the present invention, model-based estimation and control methodology based on MAF measurement is developed to accurately estimate mass airflow without introducing time delay for robust transient operations.

A method for unfiltered intake airflow determination in a substantially unthrottled internal combustion engine includes modeling intake airflow using a low-order differential equation. The low-order differential equation includes an estimated airflow term and a desired airflow term, wherein the actual airflow follows the desired airflow as described by the low-order differential equation. The low-order differential equation is tuned in accordance with adaptive parameters operative on the estimated airflow term and the desired airflow term. The tuning minimizes error between the estimated airflow term and the actual airflow.

An apparatus for unfiltered intake airflow determination in an internal combustion engine includes airflow control means for controlling airflow to engine cylinders without any substantial airflow throttling and an airflow sensor measuring substantially unthrottled airflow. Further included is a closed-loop airflow controller for controlling the airflow control means based on a desired airflow and the measured airflow from the airflow sensor. The controlled airflow follows the desired airflow in such a way that can be described by low-order dynamics. Finally included is an adaptive airflow estimator for providing an undelayed estimate of airflow based on the desired airflow and adaptive parameters.

BRIEF DESCRIPTION OF THE DRAWINGS

Embodiments of invention may take physical form in certain parts and arrangement of parts, the preferred embodiment of which will be described in detail and illustrated in the accompanying drawings which form a part hereof and wherein.

DESCRIPTION OF THE PREFERRED EMBODIMENT

The present invention will now be described with respect to a HCCI engine. However, the invention is fully applicable to other engine types, including conventionally throttled spark-ignited engines, diesel cycle engines, or any variety of engines employing measured mass airflow.

Figure 1:
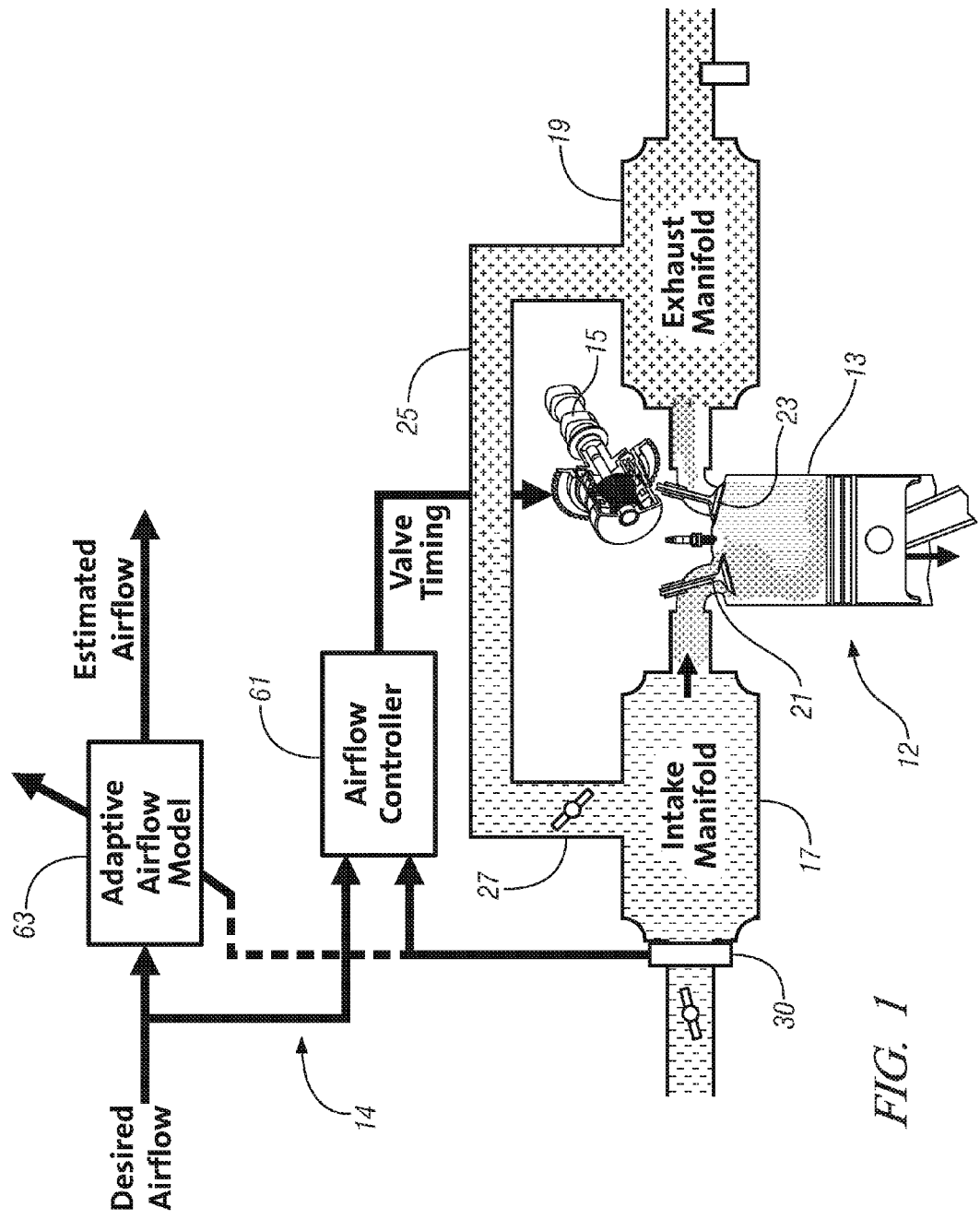
FIG. 1 schematically illustrates an HCCI engine and control system.

Referring now to FIG. 1, illustrated is a block diagram showing an engine 12 capable of operating with homogeneous charge compression ignition (HCCI) and a combustion control system 14 and method for controlling combustion in the engine.

The engine 12 may include various features or devices, including power producing combustion chambers 13 connected with an intake air system 17 and an exhaust system 19, intake 21 and exhaust 23 valves with some form of variable valve actuation system 15 operative to control intake flow to and exhaust flow from the combustion chambers, an external exhaust recirculation system 25 including an EGR valve 27 connected between the intake and exhaust systems, and fuel injection and spark ignition systems (not separately illustrated) for supplying fuel to and igniting or assisting ignition of combustible mixtures in the combustion chambers.

The engine 12 is designed to operate on fuel injected gasoline or similar blends, unthrottled with HCCI combustion over an extended range of engine speeds and loads, which may include engine starting where possible. However spark ignition and throttle controlled operation may be utilized with conventional or modified control methods under conditions not conducive to HCCI operation and to obtain maximum engine power. Applicable fueling strategies may including direct cylinder injection, port fuel injection or throttle body fuel injection. Widely available grades of gasoline and light ethanol blends thereof are preferred fuels; however, alternative liquid and gaseous fuels such as higher ethanol blends (e.g. E80, E85), neat ethanol (E99), neat methanol (M100), natural gas, hydrogen, biogas, various reformates, syngases etc. may also be used in the implementation of the present invention.

The described control system 14 and method are of particular benefit to unthrottled operation of the engine wherein time delays, introduced for example by signal filtering, of a MAF signal are undesirable. The combustion control system 14 includes one or more computers or controllers adapted to carry out a repetitive series of steps or functions in a method of combustion control according to the invention. The main controllers include a feedforward controller and a feedback controller.

In the present application of the invention, it is assumed that an HCCI engine is operating with exhaust recompression strategy with one of electro-hydraulic, hydraulic, or electric cam phaser, and that mass air flow (MAF) measurement is available with a MAF sensor. The present invention comprises an airflow control using NVO via a variable valve actuation system, and an adaptive airflow model based on the MAF measurement. The overall control structure is shown represented by control system 14 of FIG. 1.

Airflow to the engine is measured by a MAF sensor 30 located at the throttle body, and a feedback controller 61 adjusts NVO to achieve desired airflow based on the MAF measurement. The feedback controller is designed such that response of actual airflow to the desired airflow can be approximated by low-order dynamics (e.g. first or second order). Then, closed-loop response of airflow can be modeled using a low-order differential equation.

Figure 2:
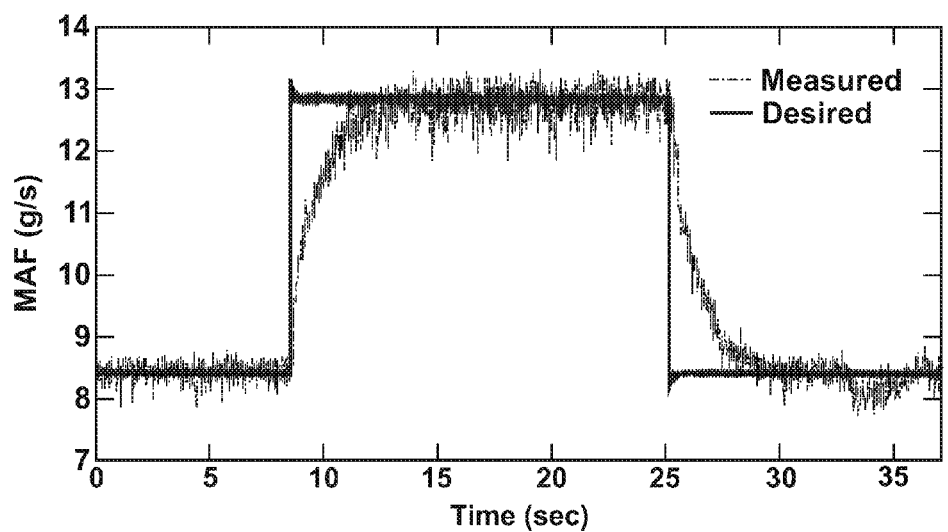
FIG. 2 illustrates measured mass airflow response to a desired mass airflow signal.

An example is shown in FIG. 2 when the feedback controller 61 is designed such that closed-loop dynamics of airflow can be approximated by a $1^{st}$ order differential equation as follows:

$$\dot{x} = -\frac{1}{\tau}x + \frac{1}{\tau}r \qquad (1)$$

where x is the airflow measured by a sensor, r is the desired airflow, and $\tau$ is the time constant of the closed-loop system. To estimate the airflow into the engine, a $1^{st}$ order adaptive airflow model 63 is introduced as follows:

$$\dot{x}_e = -\frac{1}{\tau_e}(1+\alpha)x_e + \frac{1}{\tau_e}\beta r \qquad (2)$$

where $x_e$ is the estimated airflow, $\tau_e$ is the estimated time constant of the closed-loop system, $\alpha$ and $\beta$ are control parameters employed by an adaptive controller so that the difference between response of the model and that of actual airflow is minimized. Since from the first order behavior of the airflow under control, the error between the actual and the estimated model airflow is given by the following relationship which relies, in part, upon a desired airflow term:

$$\dot{e} = -\frac{1}{\tau}e - \left(\frac{1}{\tau_e} + \frac{1}{\tau_e}\alpha - \frac{1}{\tau}\right)x_e + \left(\frac{1}{\tau_e}\beta - \frac{1}{\tau}\right)r \qquad (3)$$

where $e = x_e - x$. Adaptation laws for $\alpha$ and $\beta$ can be derived using, for example, a Lyapunov function as follows:

$$V = \frac{1}{2}e^2 + \frac{\tau_e}{2\gamma}\left(\frac{1}{\tau_e} + \frac{1}{\tau_e}\alpha - \frac{1}{\tau}\right)^2 + \frac{\tau_e}{2\gamma}\left(\frac{1}{\tau_e}\beta - \frac{1}{\tau}\right)^2 > 0, \gamma > 0 \qquad (4)$$

Finally, it can be shown that the following adaptation law guarantees $$\dot{V} = -\frac{1}{\tau}e^2 \le 0,$$

and that $e \to 0$ as $\tau \to \infty$ while $\alpha$ and $\beta$ are bounded:

$$\begin{cases} \dfrac{d\alpha}{dt} = \gamma x_e e \\ \dfrac{d\beta}{dt} = -\gamma r e \end{cases} \qquad (5)$$

Figure 3:
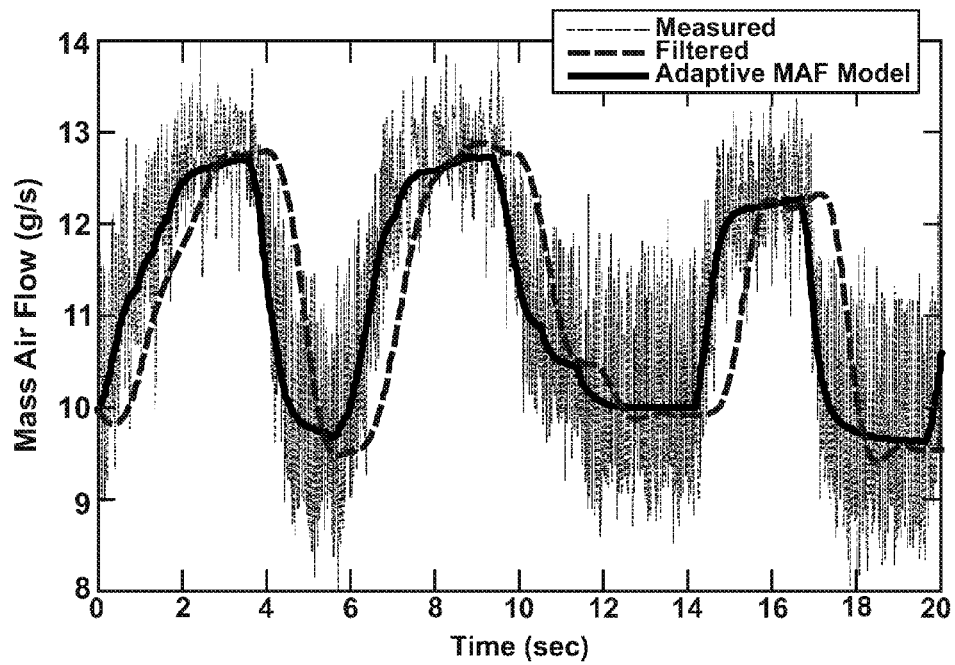
FIG. 3 illustrates measured, filtered and modeled mass airflow in accordance with the present invention; and, FIGS. 4A-4D illustrate various data graphs corresponding to an HCCI engine operated in accordance with the present invention.

FIG. 3 shows MAF sensor output from a multi-cylinder HCCI engine operated at constant engine speed of 2000 RPM, with 95 kPa of MAP. In addition, both filtered and adaptive model estimated signals are presented in the figure.

It can be seen from the FIG. 3 that MAF sensor signal (measured) contains high-frequency components which requires heavy filtering to smooth. Filtering (dashed line), however, introduces a time delay of about 1 sec. The estimated MAF signal from the adaptive model (solid line) show a negligible time delay. With the estimated airflow from the adaptive model, desired air-fuel ratio can be controlled with correct fuel injection command.

Figure 4:
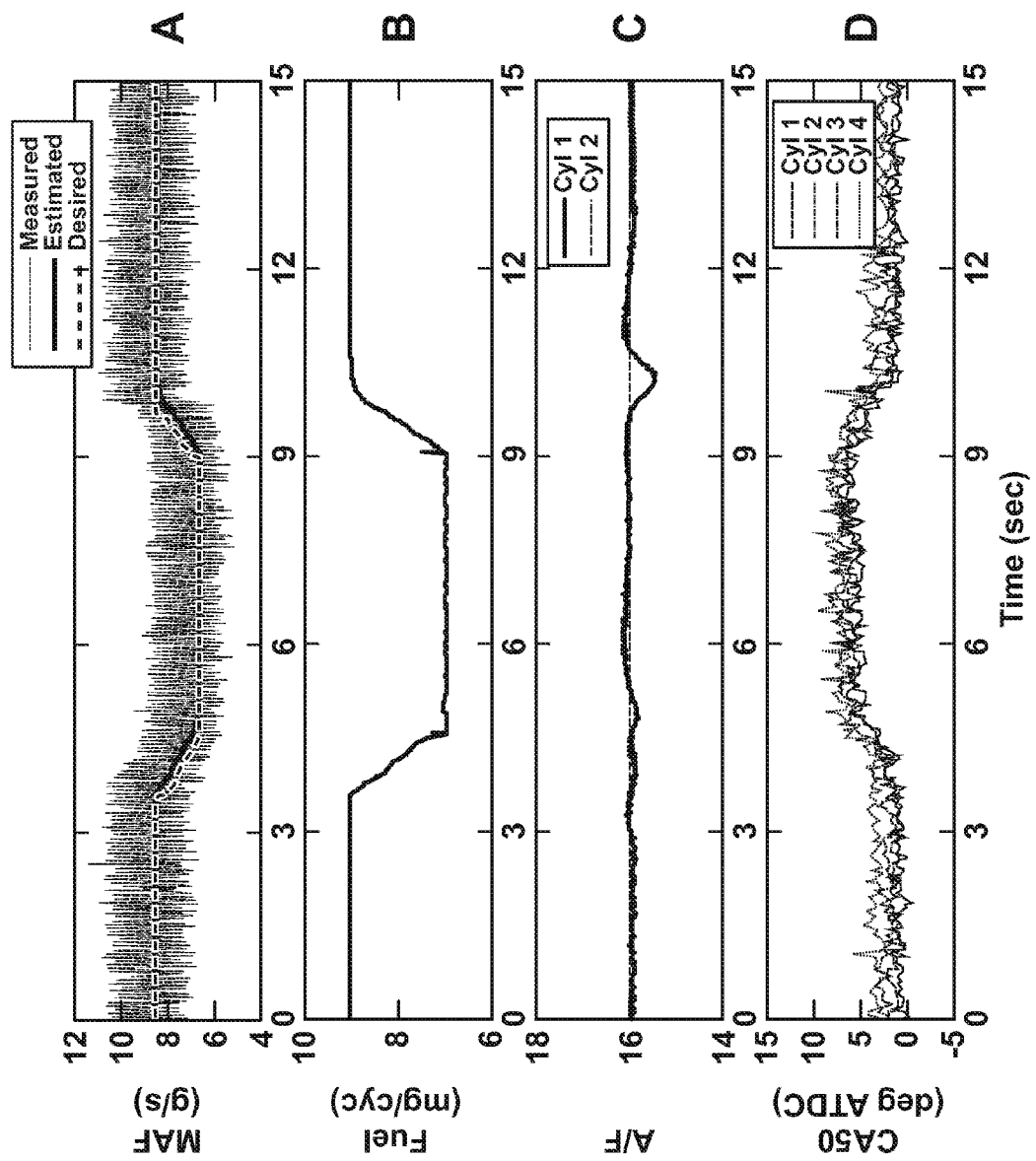

A method in accordance with an embodiment has been tested with a multi-cylinder HCCI engine, and the result is shown in FIGS. 4A-4D. The fueling rate was scheduled based on desired air-fuel ratio and estimated airflow using the present invention. The engine was operating with 95 kPa of MAP, with exhaust recompression valve strategy at constant engine speed of 2000 RPM. The desired MAF was changed from 6.5 to 8.5 g/s, with roughly 2 $g/s^2$ of change rate. The desired air-fuel ratio was set to be constant at 16:1, and the fueling rate was determined by the estimated airflow from the adaptive model and the desired air-fuel ratio. The FIG. 4C shows that peak-to-peak air-fuel ratio excursion was below 1 during load transients. Also, the combustion phasing, defined as the crank angle position of 50% fuel burned (CA50), is also shown in the figure. FIG. 4D illustrates satisfactory combustion phasing control during transients with the present invention.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. Method for estimating intake airflow in a substantially unthrottled internal combustion engine, comprising:
    modeling naturally aspirated intake airflow using a low-order differential equation including an unfiltered actual airflow signal term and a desired airflow term, wherein the unfiltered actual airflow signal follows the desired airflow as described by the low-order differential equation;
    modeling estimated intake airflow using an adaptive low-order differential equation including an estimated airflow term and the desired airflow term; and
    tuning the adaptive low-order differential equation in accordance with adaptive parameters based on the unfiltered actual airflow signal term, said adaptive parameters operative on the estimated airflow term and the desired airflow term;
    wherein said adaptive parameters are adapted to minimize error between the estimated airflow term and the unfiltered actual airflow signal.

2. The method for estimating intake airflow in a substantially unthrottled internal combustion engine as claimed in claim 1 wherein said adaptive low-order differential equation comprises a first-order differential equation.

3. The method for estimating intake airflow in a substantially unthrottled internal combustion engine as claimed in claim 1 wherein said adaptive low-order differential equation comprises a second-order differential equation.

4. The method for estimating intake airflow in a substantially unthrottled internal combustion engine as claimed in claim 2 wherein said adaptive parameters comprise a first adaptive parameter operative on the estimate of airflow and a second adaptive parameter operative on the desired airflow.

5. The method for estimating intake airflow in a substantially unthrottled internal combustion engine as claimed in claim 4 wherein adaptation of said first and second adaptive parameters is based upon a Lyapunov function.

6. The method for estimating intake airflow in a substantially unthrottled internal combustion engine as claimed in claim 1 wherein adaptation of said adaptive parameters is based upon a Lyapunov function.

7. Apparatus for estimating intake airflow in an internal combustion engine, comprising:
    air flow control means for controlling naturally aspirated airflow to engine combustion chambers without any substantial airflow throttling;
    an airflow sensor measuring substantially unthrottled and unfiltered airflow signals;
    a closed-loop airflow controller for controlling the airflow control means based on a desired airflow and the measured airflow from the airflow sensor, wherein the controlled airflow follows the desired airflow in such a way that can be described by low-order dynamics; and
    an adaptive airflow estimator for providing a substantially undelayed estimate of naturally aspirated airflow based on the desired airflow and adaptive parameters, wherein said adaptive parameters are based on the measured unfiltered airflow signals from the airflow sensor.

8. The apparatus for estimating intake airflow in an internal combustion engine as claimed in claim 7 wherein said adaptive parameters are adapted to minimize error between the estimate of airflow and the actual airflow.

9. The apparatus for estimating intake airflow in an internal combustion engine as claimed in claim 7 wherein said low-order dynamics comprise first-order dynamics.

10. The apparatus for estimating intake airflow in an internal combustion engine as claimed in claim 7 wherein said low-order dynamics comprise second-order dynamics.

11. The apparatus for estimating intake airflow in an internal combustion engine as claimed in claim 9 wherein said adaptive parameters comprise a first adaptive parameter operative on the estimate of airflow and a second adaptive parameter operative on the desired airflow.

12. The apparatus for estimating intake airflow in an internal combustion engine as claimed in claim 7 wherein said airflow control means comprise a variable valve actuation system.

13. The apparatus for estimating intake airflow in an internal combustion engine as claimed in claim 12 wherein said variable valve actuation system comprises fully flexible valve actuation.

14. The apparatus for estimating intake airflow in an internal combustion engine as claimed in claim 12 wherein said variable valve actuation system comprises cam phasing.

15. The apparatus for estimating intake airflow in an internal combustion engine as claimed in claim 12 wherein said variable valve actuation system comprises multi-step valve lift.

16. Method for estimating intake airflow in an internal combustion engine, comprising:
    controlling substantially unthrottled naturally aspirated airflow to engine combustion chambers using a variable valve actuation system with a feedback controller comprising a low-order differential equation wherein actual airflow closely follows a desired airflow;
    determining an estimated airflow using a low order differential equation and adaptive parameters operative on the estimated airflow and the desired airflow, wherein said adaptive parameters are based on unfiltered airflow signals measured by an airflow sensor.

17. The method for estimating intake airflow in an internal combustion engine as claimed in claim 16 wherein said low-order differential equation comprises a first-order differential equation.

18. The method for estimating intake airflow in an internal combustion engine as claimed in claim 16 wherein said low-order differential equation comprises a second-order differential equation.

19. The method for estimating intake airflow in an internal combustion engine as claimed in claim 17 wherein said adaptive parameters comprise a first adaptive parameter operative on the estimated airflow and a second adaptive parameter operative on the desired airflow.

20. The method for estimating intake airflow in an internal combustion engine as claimed in claim 19 wherein adaptation of said first and second adaptive parameters is based upon a Lyapunov function.

21. The method for unfiltered intake airflow estimating intake airflow in an internal combustion engine as claimed in claim 16 wherein adaptation of said adaptive parameters is determined using a Lyapunov function.

\* \* \* \* \*